(12) United States Patent
Baird

(10) Patent No.: US 8,216,463 B1
(45) Date of Patent: Jul. 10, 2012

(54) REFRIGERATOR WATER FILTER CARTRIDGE WITH LEAKAGE INDICATOR

(76) Inventor: Michael T. Baird, Temecula, CA (US)

( * ) Notice: Subject to any disclaimer, the term of this patent is extended or adjusted under 35 U.S.C. 154(b) by 499 days.

(21) Appl. No.: 12/493,940

(22) Filed: Jun. 29, 2009

(51) Int. Cl.
*B01D 27/00* (2006.01)
*B01D 27/08* (2006.01)

(52) U.S. Cl. ............. 210/232; 210/85; 277/320; 285/93

(58) Field of Classification Search .................... 210/85, 210/232; 277/320; 285/93
See application file for complete search history.

(56) References Cited

U.S. PATENT DOCUMENTS

| | | | | |
|---|---|---|---|---|
| 4,126,559 A | * | 11/1978 | Cooper | 210/445 |
| 4,331,535 A | * | 5/1982 | Pett | 210/85 |
| 5,090,871 A | * | 2/1992 | Story et al. | 417/9 |
| 5,114,572 A | * | 5/1992 | Hunter et al. | 210/120 |
| 5,482,618 A | * | 1/1996 | Hall | 210/85 |
| 5,753,107 A | | 5/1998 | Magnusson et al. | 210/109 |
| 6,027,644 A | | 2/2000 | Magnusson et al. | 210/235 |
| 6,193,884 B1 | | 2/2001 | Magnusson et al. | 210/235 |
| 6,360,764 B1 | * | 3/2002 | Fritze | 137/15.01 |

* cited by examiner

*Primary Examiner* — Thomas M Lithgow
(74) *Attorney, Agent, or Firm* — Stetina Brunda Garred & Brucker; Lowell Anderson

(57) ABSTRACT

A water filter cartridge particularly suited for a water filtration system incorporated into refrigerators includes an outer housing, a water filtration media inside the housing, and a cap affixed to an end of the housing to thereby enclose the filtration media. A portion of the cap defines a large cylindrical cavity having a channel formed therein which is positioned so that an O-ring provides a substantially water-tight seal when the filter cartridge is in an operative position in a manifold. The O-ring prevents water from otherwise flowing through the channel and externally of the water filtration system. Under normal water pressure the water filtration system will immediately visually exhibit a substantial leak if the filter cartridge is coupled to the manifold of the water filtration system in the operative position without the O-ring being positioned in the large cylindrical cavity.

20 Claims, 3 Drawing Sheets

REFRIGERATOR WATER FILTER CARTRIDGE WITH LEAKAGE INDICATOR

FIELD OF THE INVENTION

The present invention relates to the purification of drinking water, and more particularly, to replaceable filter cartridges used in household water filtration systems.

BACKGROUND OF THE INVENTION

In many geographic areas of the United States, water supplied to homes from municipalities, water districts and wells contains a high level of impurities that render the water unpalatable for drinking and making ice cubes. Therefore reverse osmosis and carbon filter type water purification systems are used on a widespread basis.

Many refrigerators are equipped with door-mounted drinking water and ice dispensers. Purified water is often supplied to such refrigerators via Copper and plastic water supply lines from water filtration systems located under the kitchen sink. Some refrigerators, such as those sold under the GE® and HOTPOINT® brands, incorporate their own dedicated water filtration system of the type disclosed in U.S. Pat. No. 5,753,107 of Magnusson et al. They employ a removable filter cartridge sold under the SmartWater™ brand which is typically replaced about every three months. The filter cartridge is located in the interior of the refrigerator and mates with a manifold using a bayonet locking scheme. The cartridge has a female end with a large cylindrical cavity and a concentric small cylindrical cavity that depends from the large cylindrical cavity. The large and small cylindrical cavities of the female end of the filter cartridge provide mating surfaces that mate with correspondingly sized male cylindrical bodies of the manifold, which are surrounded by O-rings to provide water-tight seals. Water passes through a spring biased inlet valve of the water filtration system into the cylindrical filter cartridge. The inlet valve cooperates with the filter cartridge to prevent forward flow of water until the filter cartridge is properly seated on the manifold via insertion and twisting. Water then passes from the inlet valve, downwardly to the bottom of the filter cartridge, and then upwardly through a core of the filter cartridge that contains various filtration media. Filtered water then exits the filter cartridge back into the manifold and passes through an outlet check valve that prevents back flow. The filtered water is then delivered to the ice maker and to the water dispenser.

The SmartWater filter cartridges do not have any O-rings located adjacent their mating surfaces and therefore to ensure against leaks the water filtration system is totally dependent on the integrity of the O-rings that surround the male cylindrical bodies of the manifold to prevent water leakage. A slow leak in the water filtration system resulting from improper installation of the filer cartridge or failure of the O-rings that surround the male cylindrical bodies of the manifold may go unnoticed by the homeowner, leading to a large amount of water leaking into the refrigerator and eventually onto the floor of the kitchen when finally discovered. Replacement filter cartridges for the aforementioned GE and HOTPOINT refrigerators that are sold under the BRITA® brand have included an additional O-ring mounted in the large cylindrical cavity of the filter cartridge to provide additional sealing capability.

SUMMARY OF THE INVENTION

It would therefore be desirable to improve the manifold-to-cartridge water seal in the aforementioned water filtration system.

It would further be desirable in the aforementioned water filtration system to provide an indication of a leak immediately upon installation of the filter cartridge so that incorrect installation can be readily corrected and major water leakage avoided.

According to the present invention, a water filter cartridge includes an outer housing, a water filtration media inside the housing, and a cap affixed to an end of the housing to thereby enclose the filtration media. The cap has a rim with a pair of flanges for engaging a manifold of a water filtration system to hold the filter cartridge in an operative position when twisted in the manifold. The cap further has a first portion defining a large female cylindrical cavity positioned between the flanges and sized to receive a large male cylindrical body of the manifold. The cap further has a second portion defining a small cylindrical cavity concentric to the large female cylindrical cavity and depending in an axial direction. The small cylindrical cavity is sized to receive a small male cylindrical body of the manifold. The first portion of the cap that defines the large cylindrical cavity has an inlet port positioned to allow the inflow of unfiltered water from the manifold for passage through the filtration media. The second portion of the cap that defines the small cylindrical cavity has an outlet port positioned to allow the outflow of filtered water to the manifold. An annular sealing member is seated in the large cylindrical cavity. The first portion of the cap that defines the large cylindrical cavity has a channel formed therein which is positioned so that the annular sealing member provides a substantially water-tight seal when the filter cartridge is in the operative position. The annular sealing member prevents water from otherwise flowing through the channel and externally of the water filtration system. When under normal water pressure, the water filtration system will immediately visually exhibit a substantial leak if the filter cartridge is coupled to the manifold of the water filtration system in the operative position without the annular sealing member being positioned in the large cylindrical cavity.

DETAILED DESCRIPTION

Figure 1:
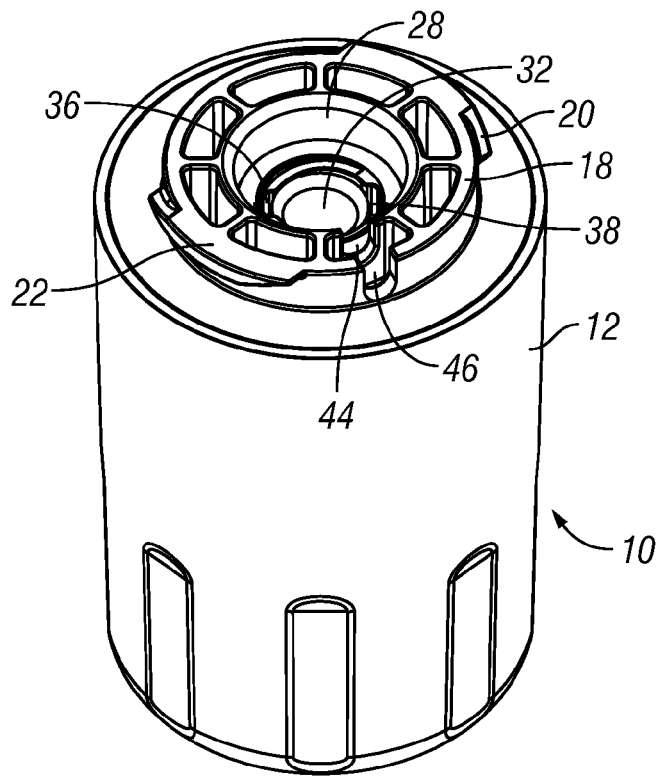
FIG. 1 is an isometric view taken from the top of a water filter cartridge in accordance with an embodiment of the present invention.
Figure 2:
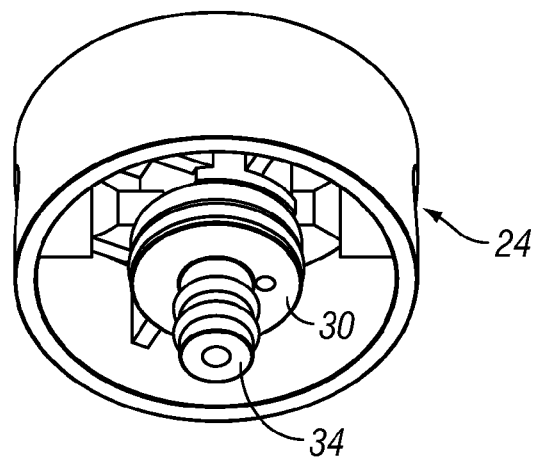
FIG. 2 is an isometric view of a manifold of a prior art water filtration system illustrating the underside thereof.
Figure 3:
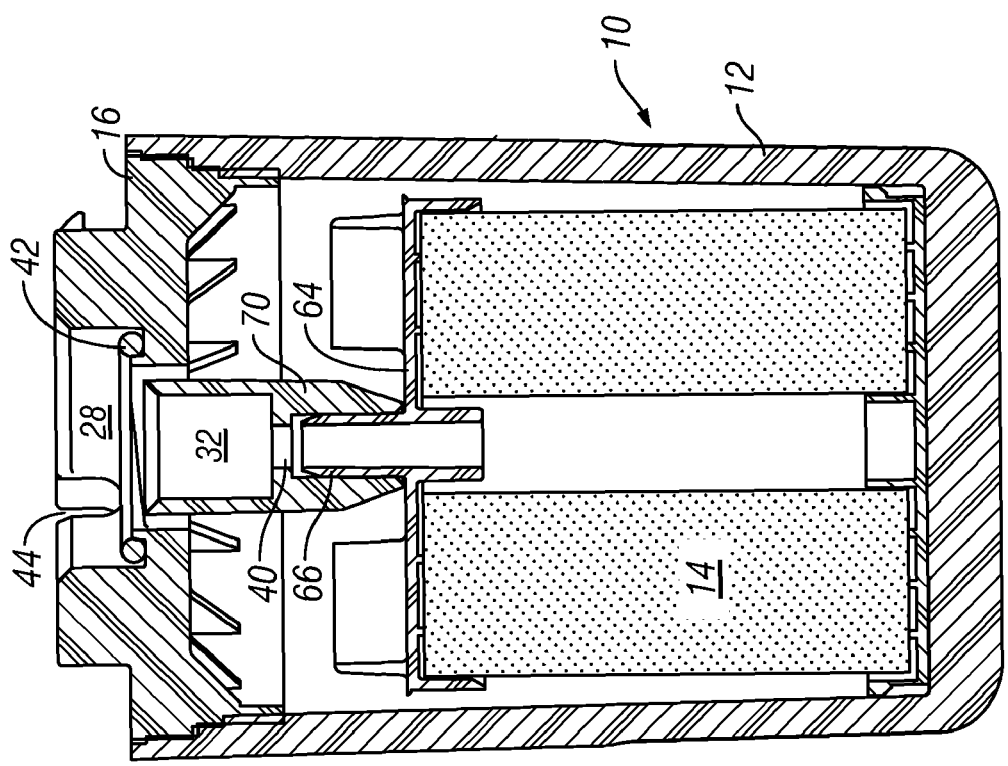
FIG. 3 is an enlarged vertical sectional view of the water filter cartridge of FIG. 1 illustrating details of its internal construction.

Referring to FIGS. 1-3, according to an embodiment of the present invention, a water filter cartridge 10 includes a cylindrical outer housing 12, a water filtration media 14 inside the housing 12, and an end cap 16 affixed to an upper end of the housing 12 to thereby enclose the filtration media 14. The filtration media 14 may be granular activated carbon (GAC), granular bactericide and/or suitable fibrous filter media such as a pleated paper, or paper with carbon, solid tubular forms of media such as formed porous carbon blocks or other formed porous filtration media. The cap 16 has a circular rim 18 (FIG. 1) with a pair of flanges 20 and 22 for engaging a cylindrical manifold 24 (FIG. 2). The manifold 24 is the type found in refrigerators, such as those sold under the GE® and HOT-POINT® brands, that incorporate their own dedicated water filtration system. See U.S. Pat. No. 5,753,107 of Magnusson et al. The flanges 20 and 22 and features on the manifold 24 form a bayonet lock mechanism. The flanges 20 and 22 firmly hold the filter cartridge 10 in an operative position when twisted and locked in the manifold 24. Collectively the filter cartridge 10 and the manifold 24 form a water filtration system. The housing 12 and cap 16 are preferably molded of white ABS plastic.

The cap 16 has a first portion defining a large female cylindrical cavity 28 (FIG. 1) that is positioned between the flanges 20 and 22 and is sized to receive a large male cylindrical body 30 (FIG. 2) of the manifold 24. The cap 16 further has a second portion defining a small cylindrical cavity 32 (FIG. 1) concentric to the large female cylindrical cavity 28 and depending downwardly in an axial direction. The small cylindrical cavity 32 is sized to receive a small male cylindrical body 34 (FIG. 2) of the manifold 24. The first portion of the cap 16 that defines the large cylindrical cavity 28 has a pair of diametrically spaced arcuate-shaped inlet ports 36 and 38 (FIG. 1) positioned to allow the inflow of unfiltered water from the manifold 24 for passage through the filtration media 14. The second portion of the cap 16 that defines the small cylindrical cavity 32 has a circular outlet port 40 (FIG. 3) that is centrally positioned to allow the outflow of filtered water to the manifold 24.

Figure 4:
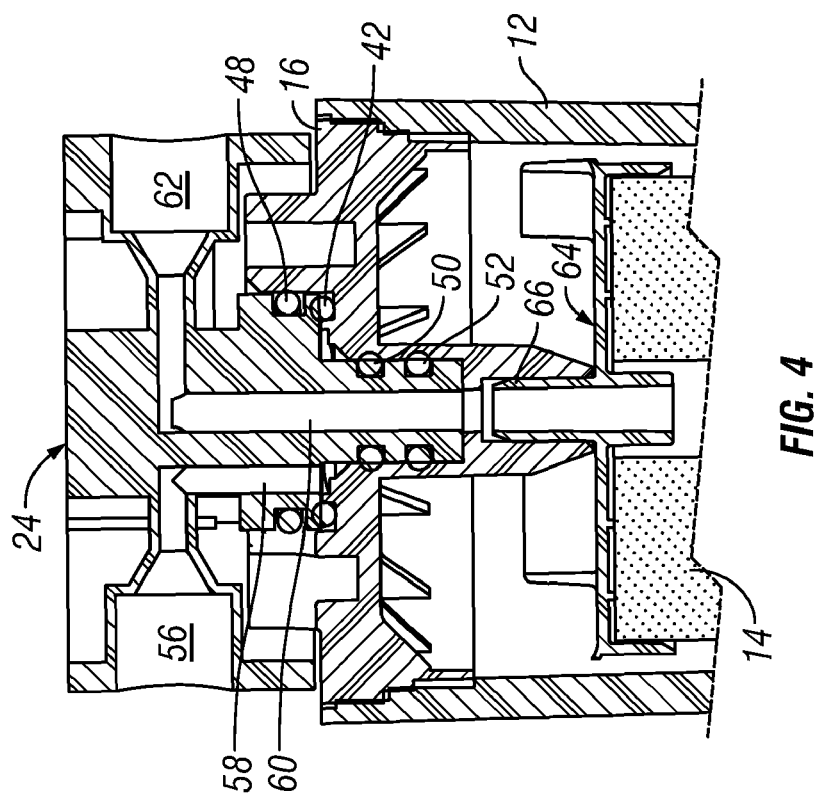
FIG. 4 is a further enlarged fragmentary vertical sectional view of the upper end of the water filter cartridge of FIG. 1 mated with the manifold of FIG. 2.
Figure 5:
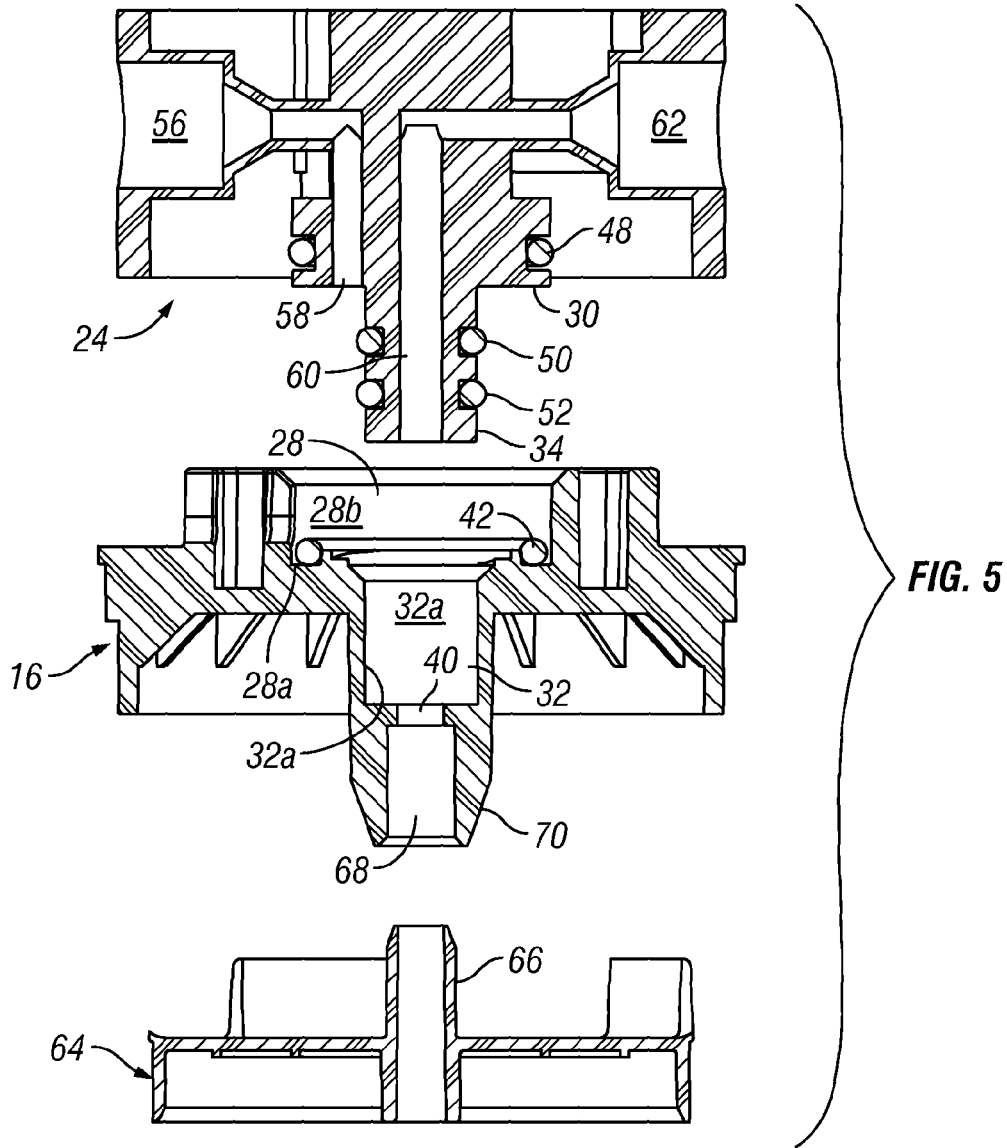
FIG. 5 is an exploded vertical sectional view of portions of the filter cartridge and manifold illustrated in FIG. 4.

An annular sealing member in the form of a deformable O-ring 42 (FIG. 5) is seated in the large cylindrical cavity 28. The O-ring 42 has a round cross-section and is made of a suitable deformable elastomeric material such a butadiene. Other forms of deformable annular sealing members can be used such as quad seals and flexible washers. In addition, compressible sealing members in the form gaskets could be utilized. The first portion of the cap 16 that defines the large cylindrical cavity 28 has a channel in the form of a slot 44 (FIGS. 1, 3 and 5) formed therein which is positioned so that the O-ring 42 provides a substantially water-tight seal when the filter cartridge 10 is locked in its operative position in the manifold 24 as illustrated in FIG. 4. The O-ring 42 is positioned so that it extends below the level of the slot 44. The slot 44 opens upwardly and extends in a generally radial direction through the portion of the cap 16 that defines the large cylindrical cavity 28. The circular rim 18 has another slot 46 formed therein that extends through the rim 18 and communicates with the slot 44. The slots 44 and 46 have the same configuration and are circumferentially aligned.

When the cartridge 10 is installed into its operative position in the manifold 24 the O-ring 42 is squeezed between the flat bottom 28a (FIG. 5) of the large cylindrical cavity 28 and the male cylindrical body 30. In this position the O-ring 42 prevents water from otherwise flowing through the slots 44 and 46 and externally of the water filtration system into the refrigerator and eventually on to the kitchen floor. When under normal water pressure, the water filtration system will immediately visually exhibit a substantial leak if the filter cartridge 10 is coupled to the manifold 24 of the water filtration system in the operative position without the O-ring 42 being positioned in the large cylindrical cavity 28.

An O-ring 48 (FIGS. 4 and 5) is seated in an exterior annular groove in the large male cylindrical body 30 of the manifold 24. The O-ring 48 is squeezed between an interior wall 28b (FIG. 5) of the cylindrical cavity 28 of the cap 16 and the cylindrical body 30 of the manifold 24 to prevent water from escaping through the cylindrical cavity 28. A pair of O-rings 50 and 52 are seated in corresponding exterior annular grooves in the small male cylindrical body 32 of the manifold 24. The O-rings 50 and 52 are squeezed between an interior wall 32a (FIG. 5) of the cylindrical cavity 32 of the cap 16 and the cylindrical body 34 of the manifold 24 to prevent water from escaping through the cylindrical cavity 32.

The manifold 24 includes an inlet port 56 (FIG. 5) leading to an inlet passage 58 that communicates with one of the inlet ports 36 and 38 of the filter cartridge 10. An outlet port 60 extends axially through the center of the cylindrical body 34 of the manifold 24 and receives filtered water passing through the outlet port 40 of the cap 16. The passage 60 leads to an outlet port 62 of the manifold 24.

The cartridge 10 further includes a mounting disc 64 (FIG. 5) that retains the filter media 14 as illustrated in FIG. 4. The mounting disc 64 may also be molded of white ABS plastic. The mounting disc 64 has a central tubular portion 66 (FIG. 5) that inserts into a cylindrical cavity 68 formed in a central axial extension 70 of the second portion of the cap 16 that defines the cylindrical cavity 32.

Figure 6:
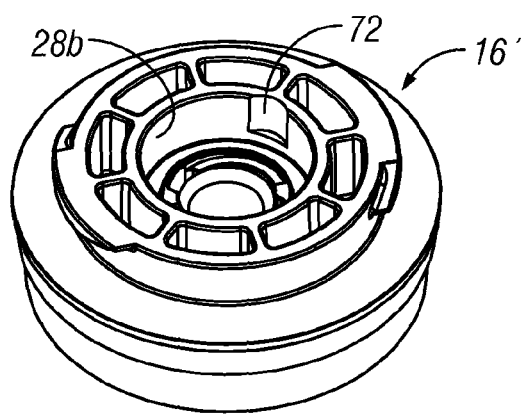
FIG. 6 is an enlarged fragmentary vertical sectional view illustrating an alternate embodiment of the cap of the water filter cartridge of the present.

FIG. 6 illustrates an alternate embodiment of the cap 16' which is similar to the cap 16 of FIGS. 1-5. However, the channel in the portion of the cap 16' defining the large cylindrical cavity 28 is formed as a recess 72. The recess 72 has an inwardly opening arcuate shape and extends in a generally axial direction along the interior wall 28b of the first portion of the cap 16 that defines the large cylindrical cavity 28. Water is vented through the axially extending recess 72 unless the O-ring 42 is installed in the cap 16'. The cap 16' does not have the radially extending slots 44 and 46.

While I have described an embodiment of a water filter cartridge with a leakage indicator, and alternate versions of its end cap, it will be understood by those skilled in the art that my invention may be modified in arrangement and detail. For example, the first portion of the cap that defines the large cylindrical cavity 28 can be formed with a plurality of circumferentially spaced channels to allow water to escape from the filter cartridge 10 if the filter cartridge 10 is coupled to the water filtration system in the operative position without the O-ring 42 positioned in the large cylindrical cavity 28. Therefore the protection afforded my invention should only be limited in accordance with the following claims.

I claim:

1. A water filter cartridge, comprising:
    an outer housing;
    a water filtration media inside the housing; and
    a cap affixed to an end of the housing to thereby enclose the filtration media, the cap having a rim with a pair of flanges for engaging a manifold of a water filtration system to hold the filter cartridge in an operative position when twisted in the manifold, the cap having a first portion defining a large female cylindrical cavity positioned between the flanges and sized to receive a large male cylindrical body of the manifold and a second portion defining a small cylindrical cavity concentric to the large female cylindrical cavity and depending in an axial direction, the small cylindrical cavity being sized to receive a small male cylindrical body of the manifold, the first portion of the cap that defines the large cylindrical cavity having an inlet port positioned to allow the inflow of unfiltered water from the manifold for passage through the filtration media, the second portion of the cap that defines the small cylindrical cavity having an outlet port positioned to allow the outflow of filtered water to the manifold, an annular sealing member seated in the large cylindrical cavity, and the first portion of the cap that defines the large cylindrical cavity having a channel formed therein which is positioned so that the annular sealing member provides a substantially watertight seal when the filter cartridge is in the operative position and the annular sealing member prevents water from otherwise flowing through the channel and externally of the water filtration system;

whereby when under normal water pressure the water filtration system will immediately visually exhibit a substantial leak if the filter cartridge is coupled to the manifold of the water filtration system in the operative position without the annular sealing member being positioned in the large cylindrical cavity.

2. The water filter cartridge of claim 1 wherein the annular sealing member is an O-ring.

3. The water filter cartridge of claim 1 wherein the channel is a slot that extends in a generally radial direction through the first portion of the cap that defines the large cylindrical cavity.

4. The water filter cartridge of claim 3 wherein the rim has a second slot that extends through the rim and communicates with the slot that extends through the first portion of the cap that defines the large cylindrical cavity.

5. The water filter cartridge of claim 1 wherein the channel is a recess that extends in a generally axial direction along an interior wall of the first portion of the cap that defines the large cylindrical cavity.

6. The water filter cartridge of claim 1 wherein the outer housing is made of plastic.

7. The water filter cartridge of claim 1 wherein the cap is made of plastic.

8. The water filter cartridge of claim 1 wherein the channel is a slot that extends in a generally radial direction through the first portion of the cap that defines the large cylindrical cavity and the rim has a second slot that extends through the rim and communicates with the slot the in the large cylindrical cavity.

9. The water filter cartridge of claim 1 wherein the first portion of the cap that defines the large cylindrical cavity has a pair of diametrically spaced inlet ports.

10. The water filter cartridge of claim 1 wherein the first portion of the cap that defines the large cylindrical cavity has a plurality of circumferentially spaced channels positioned to allow water to escape from the filter cartridge if the filter cartridge is coupled to the water filtration system in the operative position without the annular sealing member positioned in the large cylindrical cavity.

11. A water filter cartridge adapted to mate with a manifold of a water filtration system to hold the filter cartridge in an operative position when twisted in the manifold, the manifold having a large male cylindrical body and a small male cylindrical body extending axially from a center of the large male cylindrical body, the manifold having one portion of a bayonet lock for holding the cartridge in the operative position, the water filter cartridge comprising:

an outer housing;
a water filtration media inside the housing; and
a cap affixed to an end of the housing to thereby enclose the filtration media, the cap having a rim with a second portion of the bayonet lock, the cap having a first portion defining a large female cylindrical cavity positioned between the flanges and sized to receive the large male cylindrical body of the manifold and a second portion defining a small cylindrical cavity concentric to the large female cylindrical cavity and depending in an axial direction, the small cylindrical cavity being sized to receive the small male cylindrical body of the manifold, the first portion of the cap that defines the large cylindrical cavity having an inlet port positioned to allow the inflow of unfiltered water from the manifold for passage through the filtration media, the second portion of the cap that defines the small cylindrical cavity having an outlet port positioned to allow the outflow of filtered water to the manifold, an annular sealing member seated in the large cylindrical cavity, and the first portion of the cap that defines the large cylindrical cavity having a channel formed therein which is positioned so that the annular sealing member provides a substantially watertight seal when the filter cartridge is in the operative position and the annular sealing member prevents water from otherwise flowing through the channel and externally of the water filtration system.

12. The water filter cartridge of claim 11 wherein the annular sealing member is an O-ring.

13. The water filter cartridge of claim 11 wherein the channel is a slot that extends in a generally radial direction through the first portion of the cap that defines the large cylindrical cavity.

14. The water filter cartridge of claim 13 wherein the rim has a second slot that extends through the rim and communicates with the slot that extends through the first portion of the cap that defines the large cylindrical cavity.

15. The water filter cartridge of claim 11 wherein the channel is a recess that extends in a generally axial direction along an interior wall of the first portion of the cap that defines the large cylindrical cavity.

16. The water filter cartridge of claim 11 wherein the outer housing and the cap are made of plastic.

17. The water filter cartridge of claim 11 wherein the channel is a slot that extends in a generally radial direction through the first portion of the cap that defines the large cylindrical cavity and the rim has a second slot that extends through the rim and communicates with the slot the in the large cylindrical cavity.

18. The water filter cartridge of claim 11 wherein the first portion of the cap that defines the large cylindrical cavity has a pair of diametrically spaced inlet ports.

19. The water filter cartridge of claim 11 wherein the first portion of the cap that defines the large cylindrical cavity has a plurality of circumferentially spaced channels positioned to allow water to escape from the filter cartridge if the filter cartridge is coupled to the water filtration system in the operative position without the annular sealing member positioned in the large cylindrical cavity.

20. A water filter cartridge, comprising:
an outer housing;
a water filtration media inside the housing; and
a cap affixed to an end of the housing to thereby enclose the filtration media, the cap having a rim with a pair of flanges for engaging a manifold of a water filtration system to hold the filter cartridge in an operative position when twisted in the manifold, the cap having a first portion defining a large female cylindrical cavity positioned between the flanges and sized to receive a large male cylindrical body of the manifold and a second portion defining a small cylindrical cavity concentric to the large female cylindrical cavity and depending in an axial direction, the small cylindrical cavity being sized to receive a small male cylindrical body of the manifold, the first portion of the cap that defines the large cylindrical cavity having a pair of diametrically spaced inlet ports positioned to allow the inflow of unfiltered water from the manifold for passage through the filtration media, the second portion of the cap that defines the small cylindrical cavity having a circular outlet port that is centrally positioned to allow the outflow of filtered water to the manifold, an O-ring seated in the large cylindrical cavity, and the first portion of the cap that defines the large cylindrical cavity having a radially extending first slot formed therein and the rim having a second radially extending slot formed therein that communicates with the first slot, the first slot being positioned so that the O-ring provides a substantially water-tight seal when the filter cartridge is in the operative position and the O-ring prevents water from otherwise flowing through the first slot and externally of the water filtration system;

whereby when under normal water pressure the water filtration system will immediately visually exhibit a substantial leak if the filter cartridge is coupled to the manifold of the water filtration system in the operative position without the annular sealing member being positioned in the large cylindrical cavity.

\* \* \* \* \*